United States Patent [19]

Tamalet

[11] 3,795,487
[45] Mar. 5, 1974

[54] APPARATUS FOR IMPROVING HEAT TRANSFERS BETWEEN FLUIDIZED PARTICLES AND GRANULAR MATERIALS

[75] Inventor: Michel Tamalet, Rueil Malmaison, France

[73] Assignee: Societe Anonyme Heurtey, Paris, France

[22] Filed: June 11, 1971

[21] Appl. No.: 152,342

[30] Foreign Application Priority Data
June 12, 1970 France .............................. 70.21613

[52] U.S. Cl.... 23/284, 23/288 J, 23/288 S, 165/1, 165/106, 219/300, 219/302, 266/21, 432/58
[51] Int. Cl. .......... B01j 9/18, B01j 9/20, F27b 3/26
[58] Field of Search ................ 23/284, 288 S, 288 J; 263/19 B, 21 A; 266/21; 165/106; 13/20 US, 25 US, 4; 219/300, 302; 34/57 A, 57 R; 432/58

[56] References Cited
UNITED STATES PATENTS

| 2,550,722 | 5/1951  | Rollman .......................... 165/106 X |
| 2,621,113 | 12/1952 | Alther ................................ 23/288 S |
| 2,709,675 | 5/1955  | Phinney .......................... 23/288 S X |
| 2,849,384 | 8/1958  | Voorhies, Jr. et al. ......... 23/288 S X |
| 2,889,270 | 6/1959  | Marshall et al. ................ 23/288 S X |
| 3,006,609 | 10/1961 | Anthony ........................... 23/284 X |
| 3,042,390 | 7/1962  | Rausch et al. .......................... 266/21 |
| 3,042,500 | 7/1962  | Godel ..................................... 23/284 |
| 3,117,064 | 1/1964  | Friedrich ........................ 165/106 X |
| 3,234,357 | 2/1966  | Seuthe ............................ 219/300 X |
| 3,560,369 | 2/1971  | Rowland et al. .................. 263/28 X |

Primary Examiner—Joseph Scovronek
Attorney, Agent, or Firm—Davis, Hoxie, Faithfull & Hapgood

[57] ABSTRACT

The natural circulation of fine particles constituting a fluidized bed and therefore the heat transfer can be accelerated and improved in a vertical cylinder filled with ball-shaped products by immersing this cylinder in a fluidized bed of said particles and giving to the lower portion of said cylinder a tapered shape outflaring downwardly. Thus, the granular or ball material contained in the cylinder is treated therein by providing at the bottom a grate of relatively wide wire mesh capable of retaining these balls while permitting the upward circulation of the fine particles from the fluidizing bed. Heating means are disposed for various treatements, whether thermal or reactive. Alternately, the cylinder may be replaced by a conveyor belt.

14 Claims, 8 Drawing Figures

PATENTED MAR 5 1974 3,795,487

INVENTOR
MICHEL TAMALET by
Davis Hoxie Faithfull & Hapgood

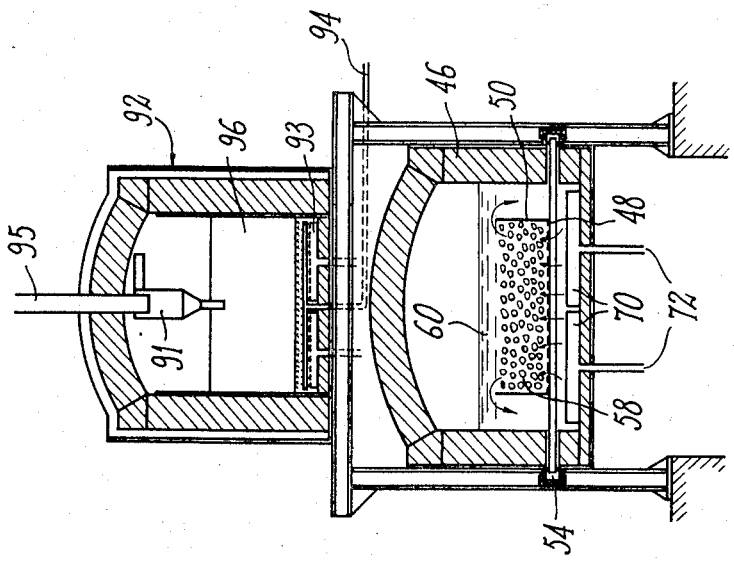
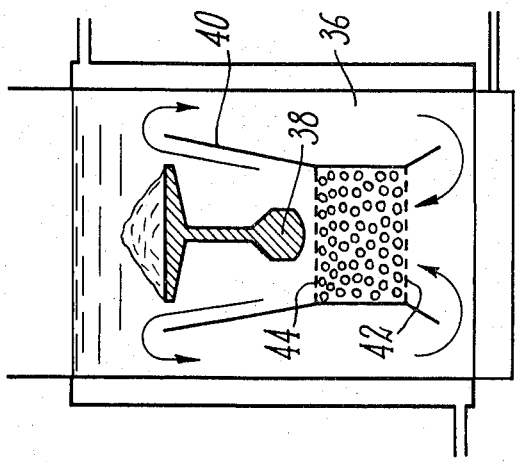

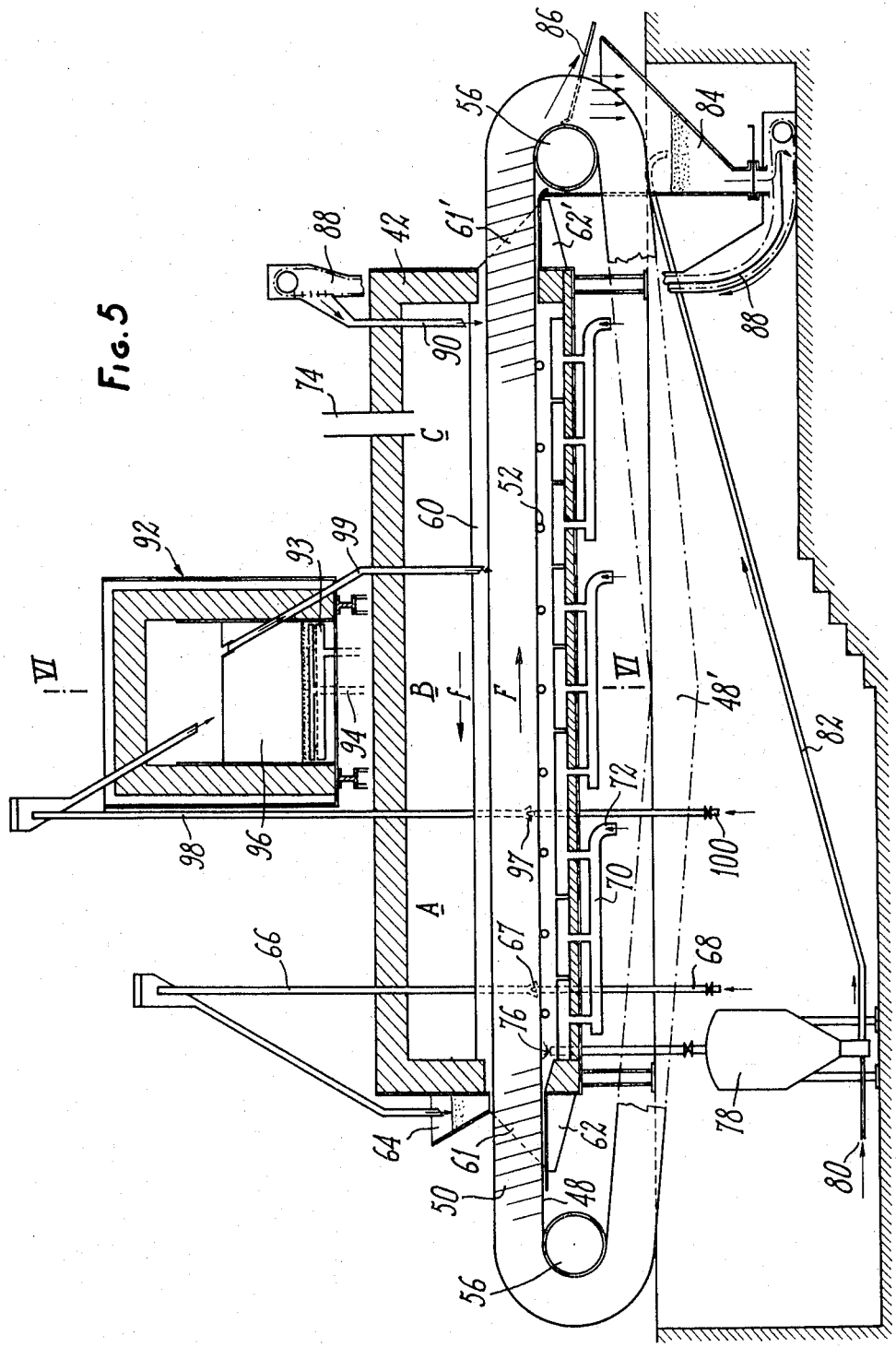

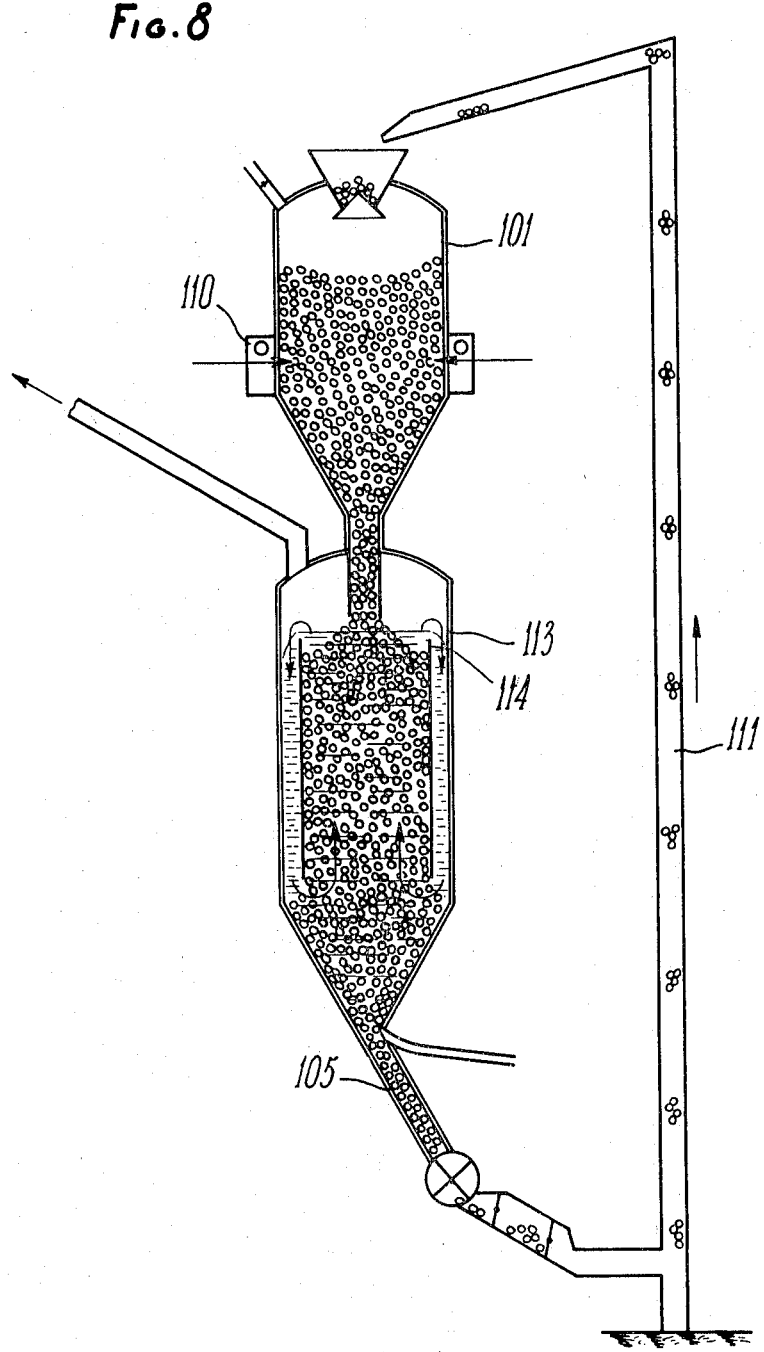

3,795,487

APPARATUS FOR IMPROVING HEAT TRANSFERS BETWEEN FLUIDIZED PARTICLES AND GRANULAR MATERIALS

The present invention relates to a method of improving heat transfer processes between a fluidized bed consisting of heated and/or cooled particles of relatively fine granulometry, such as sand, on the one hand, and a material in granular form, such as balls or the like, on the other hand.

This method is based on the unexpected discovery made by the Applicant and described hereinafter:

Referring to FIG. 1 of the attached drawing, a cylinder 12 filled with granular material, in this instance balls having a diameter of about 10 to 20 mm, was immersed in a fluidized bed 10 consisting of fine particles (for instance 100 microns). The cylinder was open at the top and provided with a wire-mesh bottom 14 capable of retaining the balls while permitting the flow of fine particles therethrough without difficulty. The Applicant found that the fine particles tended to rise between the balls retained in tube 12 up to a level definitely higher than that of the surrounding fluidized bed (about 30 percent of the height of the immersed cylinder portion). If the cylinder 12 is further lowered into the fluidized bed, it will be seen that the fine particles will eventually overflow from the top of the cylinder; consequently, a circulation of fine particles is thus established naturally in the cylinder 12, and the deeper the cylinder immersion, the greater the circulation.

The Applicant further observed that this natural circulation of the fine particles in the cylinder 12 could be improved by using a cylinder having a tapered lower portion outflaring downwards.

Consequently, the method of this invention is characterized in that the granular material is retained in an enclosure open at its upper end and provided with a bottom capable of retaining the granular material but permitting the flow of fine particles therethrough, and that when said enclosure is immersed in a fluidized bed consisting of fine particles, a particle circulation is produced in the upward direction through said granular material.

This invention is also concerned with devices for carrying out the method set forth hereinabove.

One of these devices is intended for the heat treatment of small pieces in a fluidized bed, and characterized in that it comprises a basket receiving the pieces in bulk and provided with solid walls and a bottom consisting of a grate of relatively large mesh size, this basket being immersed in the fluidized bed.

Another device according to this invention consists of a high electric emissive power resistance characterized in that it consists of a hollow tube filled with balls of relatively large diameter, this tube being open at its upper end and provided with a bottom grate permitting the passage of fine particles from the fluidized bed in which this resistance is immersed.

It is another object of this invention to provide a reactor for carrying out the method disclosed hereinabove and intended more particularly for the continuous heat treatment of ball-shaped products by means of a fluidized bed of fine particles. This reactor may be used for instance for reducing iron ore into balls, the reducing gas being used as a fluidizing gas.

This reactor comprises a heat-insulated caisson, a belt conveyor, mounted in said caisson for conveying ball products and comprising in turn lateral flanges, said conveyor belt consisting of wire mesh adapted to retain the balls while permitting the passage of said fine particles; means for sealing said caisson at either end of the conveyor belt; a fluidized bed consisting of fine particles disposed in said caisson and through which said conveyor belt and the ball load carried thereby are caused to travel while being immersed therein; diffusers disposed beneath said conveyor belt for fluidizing the particles of said fluidized bed, said particles circulating continuously upwards through the ball load of said conveyor, and means for heating the particles of said fluidized bed to the desired temperature.

Other features and advantages characterizing this invention will appear as the following description proceeds with reference to the attached drawings, in which:

FIG. 4 is a diagrammatic illustration of a device for producing a particle circulation in a fluidized bed;

FIG. 5 is vertical section taken across FIG. 6, showing a continuous reactor operating according to the method of this invention;

FIG. 6 is a section taken along the line VI—VI of FIG. 5, and

FIGS. 7 and 8 are diagrammatic vertical axial sections showing two different forms of embodiment of vertical reactors according to this invention.

Figure 1:
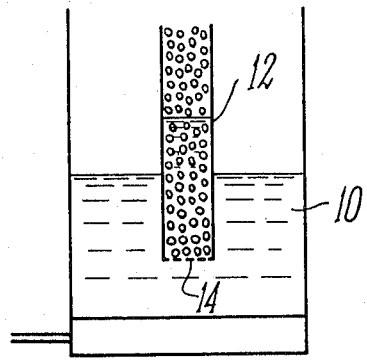
FIG. 1 is a diagram illustrating the basic principle of the method of this invention as disclosed hereinabove.
Figure 2:
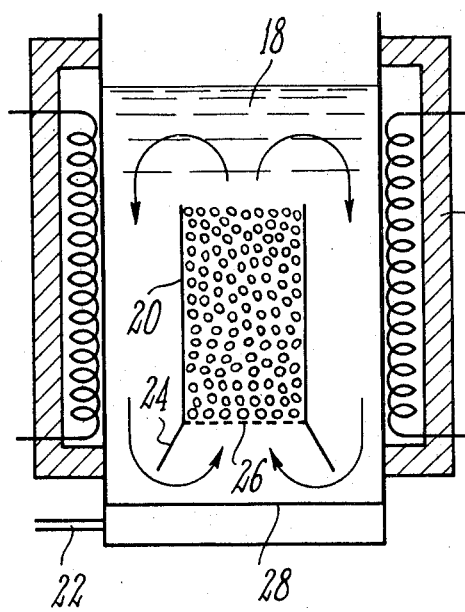
FIG. 2 is a diagrammatic vertical section showing a first form of embodiment of a device for the heat treatment of small pieces in a fluidized bed.

One of the various possible applications of the method of this invention consists in heating in a fluidized bed small pieces disposed in a basket (FIG. 2). It is frequently convenient to apply heat treatments to or re-heat, cool, etc. small pieces or articles by disposing them loosely in a basket. This method is used in general for treating pieces in media such as salt, oil or lead.

Various attempts have already been made with a view to use fluidized beds for carrying out heat treatment, but so far as the Applicant is aware none of these attempts proved to be commercially successful due to the apparent impossibility of renewing the particles constituting the heat-transfer fluid contacting the pieces to be treated. Now with the arrangement according to this invention, as shown diagrammatically in FIG. 2, this operation can be carried out without difficulty. This Figure shows an oven 16 heated by electric resistances and containing particles 18 kept in a fluidized state by a gas fed via a conduit 22 and penetrating into the oven through a pervious wall 28. A basket 20 containing the pieces to be treated is immersed in the particle bed. This basket comprises solid walls and a bottom grate 26 of relatively wide mesh size. A fine-particle circulation is established in the basket 20 through the pieces. To improve this particle circulation, the lower portion 24 of the lateral wall of basket 20 is tapered so as to diverge in the downward direction.

Figure 3:
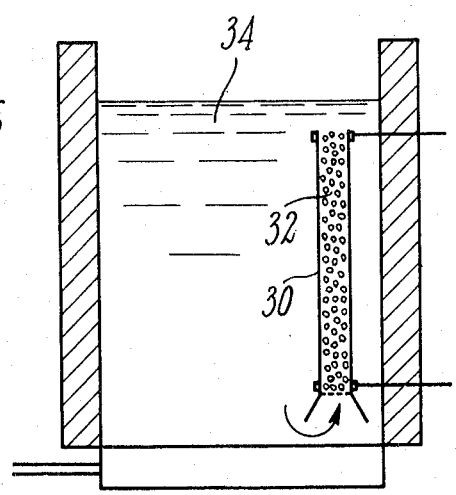
FIG. 3 illustrates in vertical section a high emissive power electric resistance for carrying out the method of this invention.

FIG. 3 illustrates an electrical resistance having a high electrical emissive power for carrying out the method of this invention. It is a delicate operation to immerse electrical resistors in fluidized beds, for any faulty fluidization is attended by the overheating and rupture of the element. With the device shown in FIG. 3 it is possible to increase considerably the resistance emitter rate while promoting the uniformity of temperature. The resistance according to the invention consists of a hollow tube 30 loaded with balls 32 of relatively large diameter and provided with a bottom grate of a mesh size capable of retaining the balls while permitting the flow of fine particles from the fluidized bed 34 therethrough. The balls 32 are inert in relation to the fluidizing gases and also to the particles of bed 34. The natural circulation of these particles through the tube 30 counteracts any tendency of the resistance to overheat.

The oven illustrated in FIG. 4 is designed for producing a particle circulation in a fluidized-bed oven. In this example the particle circulation of this fluidized bed 36 is improved about a rail 38 immersed in said bed by disposing the latter above an enclosure 40 filled with balls and provided with a bottom 42 and top plate 44 consisting both of a grate having a mesh size permitting the passage of particles.

Reference will now be made to FIGS. 5 and 6 illustrating a reactor operating according to the method of this invention, notably for the continuous heat treatment of ball-shaped products in the particles of a fluidized bed. By way of illustration, it may be emphasized that this reactor is adequate for reducing iron ore in the form of balls, the heat necessary for performing this reduction being supplied by creating a hot sand circulation from a fluidized-bed reactor, for example an external reactor.

This reactor consists of a caisson 46 which is both fluid-tight and completely heat-insulated. In this caisson a conveyor belt 48 provided with side flanges 50 is disposed and supported by rollers 52 having their bearings 54 mounted externally, the belt driving sprockets 56 being disposed externally of the oven as well as the slack run 48' of the conveyor belt. The products 58 to be treated e.g. balls are laid in the form of a relatively thick layer — (about 30-cm or 12-inch thick) on said conveyor belt 48. The belt proper consists (FIG. 6) of wire mesh capable of retaining the balls 58 while permitting the passage of particles from a fluidized bed 60 formed in the caisson 46 and through which the conveyor belt is caused to travel. Since this belt travels through the caisson 46, adequate sealing means must be provided at either end thereof. In this form of embodiment the sealing effect is obtained by using piles of particles (or sand) 61, 61' supported by ledges 62 and 62', respectively. The pile of particles 61' is formed naturally, since the conveyor belt travels in the direction of the arrow F, i.e., towards the exit end of the oven. On the other hand, at the input end thereof the pile 61 must be formed artificially by providing a hopper 64 adapted to deliver particles taken from the fluidized bed 60 at 67 by means of a pump 66 receiving driving gas from an injector 68.

The particle bed 60 contained in the caisson 46 for the heat treatment of the balls is fluidized with the assistance of diffusers or manifolds 70 supplied with atmosphere gas through conduits 72. After flowing through the fluidized bed 60 and the batch of balls to be treated on the conveyor belt 48, this atmosphere gas is picked up in the upper portion of the reactor by means of a conduit 74. Moreover, this gas may be cleaned, regenerated and recycled in the reactor by using means neither shown nor described herein, since they are no part of this invention.

In this exemplary form of embodiment the reactor comprises 3 zones, namely:
- a preheating zone A,
- a heating and treatment zone proper B, and
- a cooling zone C.

In fact, it is frequently necessary to cool the products in the gaseous atmosphere in order to avoid possible reoxidation of the products at the outside.

Within the reactor the circulation of the fluidized bed 60 takes place (arrow f) in counter-current relationship to the direction of feed of the ball-shaped products to be treated (arrow F), that is, in a direction opposite to the direction of feed of conveyor belt 48, in order to permit the recovery of the sensible heat from the products. To obtain this particle circulation the cold particles (i.e., those from the fluidized bed 60 having lost most of their heat during their upward travel through the ball layer) are collected at 76 by a pneumatic handling apparatus 78 of conventional, well-known type, supplied with compressed air at 80. The thus collected particles are delivered pneumatically via a conduit 82 to a hopper 84. This hopper 84 receives on the other hand the fine particles carried along by the treated products at the exit end of the caisson, these particles being separated from the caisson by a sieve 86.

A mechanical handling device, such as a device of the known "Redler" type designated by the reference numeral 88, picks up these particles from the hopper 84 and reintroduces them into the fluidized bed 60 at 90 in the cooling zone C, at the outlet end of the reactor. Preferably, a "Redler" type conveyor will be used for this handling method as it permits of introducing particles into the caisson while ensuring a highly reliable sealing of the apparatus. Its rate of feed is so adjusted that the level obtaining in hopper 84 remains substantially constant.

The reactor further comprises means for heating the fine particles (or sand) of fluidized bed 60. In this specific form of embodiment the particles are heated by means of an auxiliary reactor located externally of the reactor according to this invention. In this case the auxiliary reactor 92 is of the type comprising fluidized bed heated by an internal gas combustion. The combustion gas is fed via a harness 94 and the combustion air through diffusers 93. The smokes are sucked by a cyclone 91 and discharged through a chimney 95. The heating reactor 92 is disposed at the upper portion of caisson 46 and supported by a metal frame — work.

The particles to be heated are picked up at 97 by a pump 98 from the fluidized bed 60 as they emerge from the heating zone B and forced by this pump into the fluidized bed 96 of heating reactor 92; after being heated in this reactor, they are returned to the fluidized bed 60 at the input end of zone B by a conduit 99 operating as an overflow device. The particle output in the heating loop formed by pump 98, bed 96, conduit 99 and fluidized bed 60 (zone B) is adjusted by varying the fluid vehicle fed at 100 (e.g. compressed air) to pump 98.

The temperature of the fluidized bed 96 of heating reactor 92 is kept at a constant value by a suitable regulation. The heat treatment temperature applied to the ball-shaped products during the treatment proper is adjusted through the circulation of hot fine particles in the vertical loop (elements 98 and 99).

It is clear that, since the conveyor belt 48 consists of wire mesh capable of retaining the balls while permitting the passage of the fine particles, a continuous circulation of these particles takes place through the layer of balls carried by the belt 48, according to the process explained in the foregoing, so that these balls are strongly heated or cooled, the fluidizing gas causing the desired chemical transformations of the products to be treated.

Figure 7:
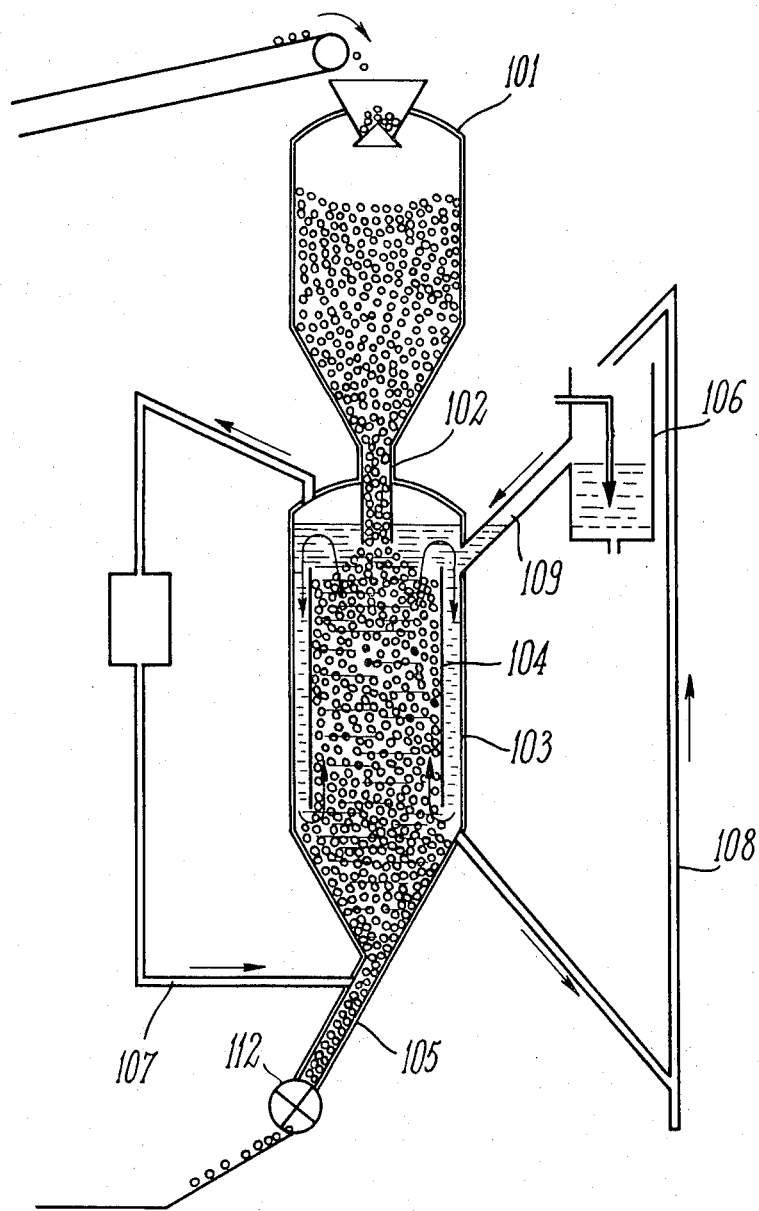

FIGS. 7 and 8 of the drawings illustrate diagrammatically in section vertical reactors constructed according to the teachings of this invention.

With these two modified forms of embodiment a reactive contribution may be made to the treated product, in addition to the thermal contribution.

The reactor illustrated in FIG. 7 is designed for accomplishing the physico-chemical treatment of ball-shaped products. In this reactor the gas is chemically active in relation to the balls and the heat supply of any desired and suitable value is provided by an upward circulation, through the layer of balls, of fine fluidized particles heated or cooled in an external fluidized bed.

The reactor comprises an upper hopper 101 for the storage of the product in ball form to be treated, which is supplied via a conduit 102 to a carefully heat insulated enclosure or chamber 103. A cylinder 104 open at either end is disposed within this enclosure or chamber 103, the balls descending through the cylinder 104 at a controlled rate. At the lower end of enclosure 103 is an extractor 112 for the treated balls.

The enclosure 103 is filled with particles brought to the desired temperature in a fluidized bed 106 disposed externally of the treatment plant proper. A fluidizing gas inlet 107 is provided at the lower portion of enclosure 103 for fluidizing the particles.

According to the method of this invention, an intense circulation of particles is produced within the cylinder 104 (as shown by the arrows). As the heat is transferred to the products to be treated the cooled particles are extracted from the lower portion of enclosure 103 and fed back to the fluidized bed 106 by means of a particle-handling pump 108. An overflow 109 is provided to permit the flow of the re-heated particles into the enclosure 103. The fluidizing gas may be recycled, possibly after having been regenerated. The rate of flow of the fluidizing gas at the lower end of enclosure 103 is such that the fine particles can be separated from the balls in conduit 105.

The above described reactor may be used for oxide reduction processes or other chemical treatment processes. Thus, the following processes may be cited by way of example, not of limitation:

(1) IRON ORE REDUCTION

A reducing gas is used as a fluidizng gas. This reaction is endothermic:

$$Fe_3O_4 + H_2 \rightarrow 3Fe + 4H_2O - 35 \text{ Kcal/molecule gram}.$$

The fluidized bed particles are heated to the necessary temperature (500° C) for causing the reduction reaction to take place.

(2) URANIUM DIOXIDE FLUORINATION

This reaction is exothermic:

$$3F_2 + UO_2 \rightarrow UF_6 + 3O_2 + 259 \text{ Kcal/molecule gram}.$$

The particles must necessarily be cooled in the fluidized bed 106 in order to recycle them at the proper temperature within the enclosure 103.

In the reactor illustrated in FIG. 8 it is contemplated to reheat a fluidized bed of fine particles by means of a ball circulation, the fluidizing gas being active in relation to the fine particles. This application is advantageous, notably when it is desired to heat a fluidizing bed without any risk of pollution or oxidation.

As in the case of the above-described reactor (FIG. 7), the fluidized bed of fine particles is maintained (FIG. 8) in an enclosure 113 supplied with balls or like products via a hopper 101. In the enclosure 113 a cylinder 114 open at either end is disposed and permits a high-rate particle circulation.

The balls are preheated in the hopper 101 through any suitable means, for instance by using a row of burners 110. These balls are circulated for example by using a suitable elevator 111 between the cylinder 114 and conduit 105, on the one hand, and the feed hopper 101, on the other hand.

This modified construction may be used for example when reheating a catalyst. This heating method is advantageous, in comparison with hitherto known heating systems, in that any oxidation of the component elements of the catalyst (such as Ni) is definitely precluded, since at no time the particles are in direct contact with the combustion gases.

It will be noted that in this alternate form of embodiment a closed-circuit particle circulation is produced within the enclosure 113 of the reactor. A similar arrangement but modified to produce a renewal of the particles constituting the fluidized bed may be contemplated for example when it is desired to regenerate a catalyst.

I claim:

1. A horizontal reactor for continuous heat treatment of a particulate product of relatively coarse granulometry comprising:
    a heat insulated caisson;
    a wire mesh conveyor belt having side flanges for transporting said particulate product through said caisson, said conveyor belt being spaced above the bottom of said caisson and the side flanges of said conveyor belt being spaced from the adjacent side walls of said caisson;
    means for sealing each end of said caisson;
    a bed of particles of relatively fine granulometry in said caisson;
    diffusers disposed in the bottom of said caisson beneath said conveyor belt for fluidizing said bed of relatively fine particles to immerse said conveyor belt in fluidized relatively fine particles which circulate continuously upward through the conveyor belt and the particulate product disposed thereon and downward between the side flanges and the side walls of said caisson; and
    means for heating at least a portion of said fine particles to the desired temperature.

2. The reactor defined in claim 1 wherein said means for sealing each end of said caisson comprises a pile of said fine particles supported by an end ledge.

3. The apparatus defined in claim 2 further comprising:

means for withdrawing fine particles from said fluidized bed at a predetermined rate and means for supplying the withdrawn particles to form the pile of fine particles at the input end of said caisson.

4. The reactor defined in claim 1 further comprising means for supplying an atmospheric gas to said diffusers under pressure.

5. The reactor defined in claim 4 further comprising a conduit in the upper portion of the reactor for collecting said atmospheric gas after it has passed through said fluidized bed and said particulate product.

6. The reactor defined in claim 1 further comprising means for circulating said fluidized bed in a direction opposite to the direction of feed of said conveyor belt.

7. The reactor defined in claim 6 wherein said means for circulating comprises:

a hopper;

means for pneumatically picking up particles from said fluidized bed at the input end of said caisson and conveying said particles to said hopper; and means for re-introducing the particles in said hopper into the fluidized bed at the exit end of said caisson.

8. The reactor defined in claim 7 further comprising means for separating said fine particles from said particulate product at the exit end of said conveyor belt and conveying said fine particles to said hopper.

9. The reactor defined in claim 1 wherein said means for heating comprises a reactor external to said caisson.

10. The reactor defined in claim 9 wherein particles are heated by internal combustion of gas in a second fluidized bed of said particles in said external reactor and wherein said means for heating further comprises:

means for withdrawing particles from the fluidized bed of said reactor;

means for conveying the particles withdrawn from said reactor to said external reactor; and an overflow conduit for returning heated particles from said external reactor to said fluidized bed.

11. The reactor defined in claim 9 wherein said external reactor is disposed above said caisson and supported by a structural framework.

12. The reactor defined in claim 10 further comprising regulating means for maintaining the temperature of said second fluidized bed essentially constant.

13. A vertical reactor for physico-chemical treatment of a particulate product of relatively coarse granulometry comprising:

an enclosure filled with particles of relatively fine granulometry;

a hollow cylinder open at both ends disposed in said enclosure with its longitudinal axis substantially vertical, said cylinder being immersed in said relatively fine particles;

means for introducing said particulate product into the top of said cylinder;

an outlet for the treated product at the bottom of said enclosure beneath the cylinder;

means for introducing a fluidizing gas into the lower portion of said enclosure to fluidize said relatively fine particles and produce an intense upward circulation of said fine particles through the coarse particles in said cylinder, said fluidizing gas being chemically active in relation to said particulate product; and an outlet for said fluidizing gas at the top of said enclosure.

14. A vertical reactor for heating a fluidized bed of particles of relatively fine granulometry comprising:

an enclosure containing said relatively fine particles;

a hollow cylinder open at both ends disposed in said enclosure with its longitudinal axis substantially vertical, said cylinder being immersed in said relatively fine particles;

a hopper containing particles of relatively coarse granulometry;

means for heating said relatively coarse particles in said hopper;

means for introducing heated relatively coarse particles from said hopper into the top of said cylinder;

means for fluidizing said relatively fine particles in said container to produce an intense upward circulation of said relatively fine particles through the relatively coarse particles in said cylinder;

an outlet for said relatively coarse particles at the bottom of said enclosure beneath the cylinder; and means for conveying said relatively coarse particles from said outlet to said hopper.

\* \* \* \* \*